United States Patent [19]

Tanimoto et al.

[11] Patent Number: 5,067,688

[45] Date of Patent: Nov. 26, 1991

[54] SOLENOID VALVE

[75] Inventors: Yoshimitsu Tanimoto, Himeji; Akitoshi Kamada, Sanda, both of Japan

[73] Assignee: Mitsubishi Denki K.K., Tokyo, Japan

[21] Appl. No.: 609,856

[22] Filed: Nov. 7, 1990

[30] Foreign Application Priority Data

Nov. 9, 1989 [JP] Japan .................................. 1-293211

[51] Int. Cl.⁵ ............................................. F16K 31/06
[52] U.S. Cl. ............................ 251/129.18; 251/129.15
[58] Field of Search ....................... 251/129.15, 129.18

[56] References Cited

U.S. PATENT DOCUMENTS 4,310,123  1/1982  Tepastte ..................... 251/129.15 X
4,951,878  8/1990  Casey et al. ................ 251/129.15 X Primary Examiner—Arnold Rosenthal
Attorney, Agent, or Firm—Sughrue, Mion, Zinn, Macpeak & Seas

[57] ABSTRACT

A solenoid valve comprising a cylindrical casing (1), a coil (2) wound around a bobbin (3) and housed within the casing (1). Concentrically disposed within the casing (1) are a stationary iron core (4) having a radially inward recess or an annular groove (4d) and a valve plunger (5) for operating a valve unit (5a, 8). The casing (1) has inward projections (1a) formed in its inner surface which extend into the inward recess (4d) of the stationary iron core (4), for axially securing the stationary iron core (4) with respect to the casing (1).

3 Claims, 2 Drawing Sheets

SOLENOID VALVE

BACKGROUND OF THE INVENTION

This invention relates to a solenoid valve.

FIGS. 3 and 4 illustrate the conventional solenoid valve in a side sectional view and a plan view, respectively. In the figures, reference numeral 1 is a casing, 2 is a coil wound around a bobbin 3, 4 is a stationary iron core comprising a stationary portion 4a having a threaded bore having thread engagedly therein an adjustment portion 4b which is adjustable in axial position relative to the stationary portion 4a. The stationary portion 4a and the adjustment portion 4b are secured to each other by calking 4c at the threaded engagement portions. 5 is a plunger magnetically attracted toward the stationary iron core 4 upon the energization of the coil 2, the plunger 5 having at its one end an actuator element 6 opposing to the adjustment portion 4a of the stationary portion 4b of the stationary iron core 4 with a gap S therebetween. 7 is a spring for spring-biasing the plunger 5 in the direction away from the stationary iron core 4, 8 is a valve seat having an opening opened or closed by a vlave end of the plunger 5, 9 and 10 are fluid inlet and outlet ports.

The operation will now be described. The plunger 5 which closes the opening of the valve seat 8 by the spring action of the spring 7 is separated from the valve seat 8 by the magnetic attraction toward the stationary iron core 4 upon the energization of the coil 2. Therefore, by switching on and off the current to the coil 2, the opening of the valve seal 8 can be opened and closed. At this time, the stroke of the plunger 5 is determined by the gap S defined between the stationary iron core 4 and the actuator element 6 of the plunger 5, and the adjustment portion 4b is threaded-engaged into the stationary portion 4a in order to adjust the gap S. The adjustment of the gap S can be achieved by first securing the stationary portion 4a of the stationary iron core 4 to the casing 1 by calking, and then rotating the adjustment portion 4b relative to the stationary portion 4a to adjust the axial dimension of the gap S, and finally forming calking portions 4c at the threaded portion to prevent any rotation of the adjustment portion 4b.

With the conventional solenoid valve as above described, the stationary iron core 4 is composed of the stationary portion 4a and the adjustment portion 4b thread-engaged with the stationary portion 4a. Therefore, the structure is complicated and the adjustment of the gap S requires several steps, such as securing the stationary portion 4a to the casing 1 and rotating the adjustment portion 4b to obtain a desired gap S and further forming calking portions at the threaded portion to prevent undesirable rotation of the adjustment portion 4b, resulting in a complicated gap adjusting process including a number of steps. Also, the precise adjustment of the gap S cannot easily be achieved because a large axial force is applied to the adjustment portion 4b in the direction of movement of the plunger 5, i.e., the direction of adjustment of the gap S during the formation of the calking portions 4c.

SUMMARY OF THE INVENTION

Accordingly, an object of the present invention is to provide a solenoid valve which is free from the above-discussed problems of the conventional design.

Another object of the present invention is to provide a solenoid valve which is simple in structure.

Still another object of the present invention is to provide a solenoid valve in which the gap adjustment can be achieved easily and precisely.

A further object of the present invention is to provide a solenoid valve which is simple in structure and easy and precise in the gap adjustment.

With the above objects in view, the solenoid valve of the present invention comprises a casing, a coil wound around a bobbin and housed within the casing, a stationary iron core disposed within the casing and extending into the bobbin, and a plunger capable of being magnetically attracted toward the stationary iron core upon energization of the coil and a spring for biasing the plunger away from the stationary iron core. The stationary iron core has a radially inward recess, and the casing has formed in the inner surface of the casing a radially inward projection extending into the radially inward recess of the stationary iron core, for securing the stationary iron core in an axial direction relative to the casing. The stationary iron core may be concentrically disposed within the cylindrical wall of the casing and has formed therein an annular groove for receiving therein the radially inward projection. An elastic member may be disposed between the stationary iron core and the coil.

According to the present invention, after the adjustment of the gap between the stationary contacts and the plunger, the stationary iron core can be locked against rotation relative to the casing by utilizing calking technique to the adjustment stationary portion.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
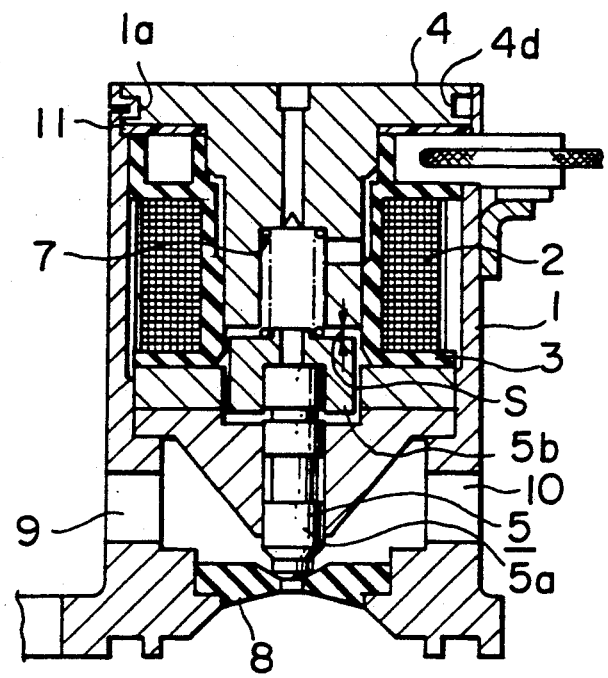
FIG. 1 is a sectional view of one embodiment of the solenoid valve of the present invention.
Figure 2:
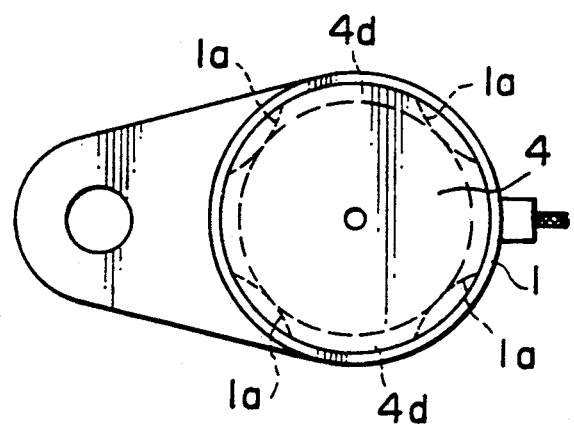
FIG. 2 is a plan view of the solenoid valve of the present invention illustrated in FIG. 1.

FIGS. 1 and 2 are a sectional view and a plan view, respectively, of one embodiment of the solenoid valve of the present invention. It is seen that a stationary iron core 4 of this embodiment is an integral single member comprising a cylindrical main body extended into the central bore of the coil bobbin 3 and a flange radially extending from an outer end of the main body. An outer periphery of the flange is secured to the casing 1 through the stationary adjustment portion 4d which is an annular groove circumferentially extending in the circumference of the flange for receiving therein a plurality of equally spaced inward projections 1a formed in the cylindrical wall of the casing 1. In the illustrated embodiment, the inward projections 1a may be formed by calking or plastically depressing the casing wall from the outside thereof into the annular groove 4d. Since this calking can be achieved only by a radially inward force, the axial position of the stationary iron core 4 is not changed.

Figure 3:
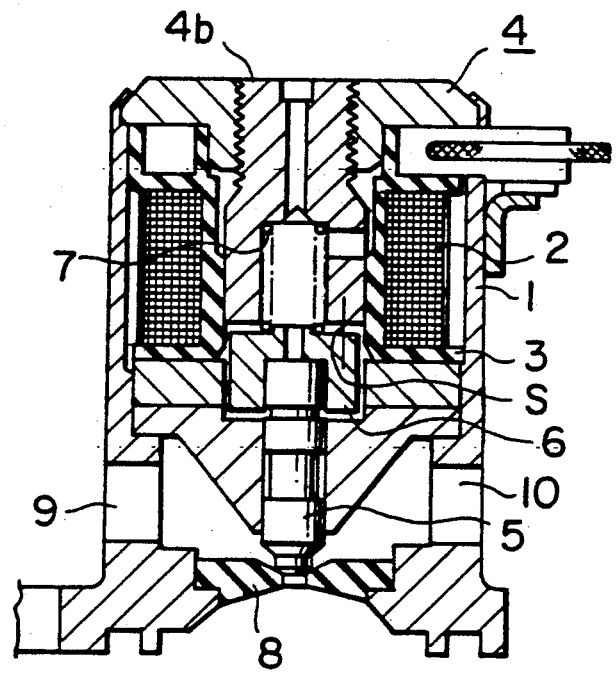
FIG. 3 is a sectional view of a conventional solenoid valve.
Figure 4:
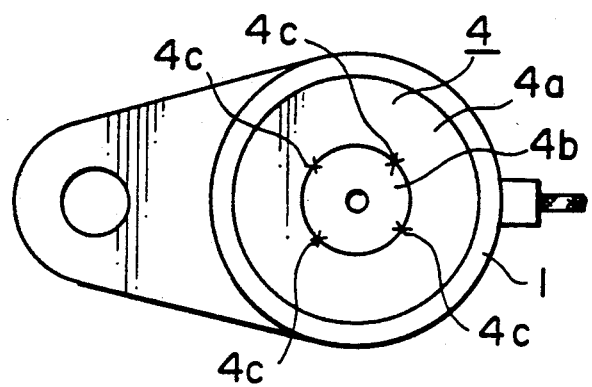
FIG. 4 is a plan view of the conventional solenoid valve illustrated in FIG. 3.

The gap S defined between the plunger 5 and the stationary iron core 4 is a gap between the portion of the stationary iron core 4 inserted within the coil bobbin 3 and the actuator element 6 of the plunger 5. Also, an elastic member 11 is interposed between the stationary iron core 4 and the coil bobbin 3. Since other components are the same as those of the conventional design illustrated in FIG. 3, they are assigned with the same reference numerals and their explanations are omitted.

In order to precisely determine the gap S, all the components except for the stationary iron core 4 are first assembled within the casing 1, and the stationary iron core 4 is placed on the elastic member 11 on the coil bobbin 3. Then the stationary iron core 4 is pressed into the casing 1 against the spring force of the compression spring 7 until the gap S between the stationary iron core 4 and the actuator element 6 of the plunger 5 has a desired dimension. The casing 1 is then deformed by calking from the outside of the casing 1 in the radial direction to secure the stationary iron core 4 in position.

The adjustment member 4d of this embodiment is an annular groove and the movement of the calking plunger member (not shown) which moves radially inwardly to depress the circumferential wall of the casing 1 into the annular groove and the movement of the pushing rod (not shown) which axially pushes the stationary iron core 4 into the casing 1 may be made in synchronization with each other. With this arrangement, a separate positioning step for precisely positioning the calking plunger member and the annular groove is not necessary, resulting in an easy calking of the casing 1 into the annular groove.

As has been described according to the present invention, since the stationary iron core is secured at the adjustment stationary portion to the casing, the stationary iron core may be a single integral structure, the adjustment of the gap S as well as the securing of the stationary iron core to the casing can be efficiently and easily achieved. Also, since the calking of the adjustment securing portion is achieved from the outside of the casing in the direction perpendicular to the direction of adjustment of the gap S, the undesirable change of the gap S is eliminated, resulting in a high precision assembly.

What is claimed is:

1. A solenoid valve comprising:

a casing (1);

a coil (2) wound around a bobbin and housed within said casing;

an initially axially adjustable and thereafter stationary iron core (4) disposed within said casing, extending into said bobbin having a radially inward recess (4d);

a plunger (5) capable of being magnetically attracted toward said stationary iron core upon energization of said coil, and a spring (7) for biasing said plunger away from said iron core, a gap (S) being defined between confronting portions of said plunger and said iron core; and means for fixing the axially adjusted position of said iron core to attendantly fix said gap at a predetermined dimension, said fixing means including a radially inwardly deformable member contiguous with said casing and extendable into said radially inward recess of said stationary iron core, for anchoring said core in an axial direction relative to said casing.

2. A solenoid valve as claimed in claim 1, wherein said casing has a substantially cylindrical wall having said radially inward projection, said stationary iron core is concentrically disposed within said cylindrical wall of said casing and has formed therein an annular groove for receiving therein said radially inward projection of said casing wall, whereby said stationary iron core is axially secured with respect to said casing.

3. A solenoid valve as claimed in claim 1, further comprising an elastic member between said stationary iron core and said coil.

* * * * *